(12) United States Patent
Inglis

(10) Patent No.: US 7,014,394 B2
(45) Date of Patent: Mar. 21, 2006

(54) CUTTING TOOL

(75) Inventor: John Inglis, Coventry (GB)

(73) Assignee: Exactaform Cutting Tools, Ltd., Coventry (GB)

( * ) Notice: Subject to any disclaimer, the term of this patent is extended or adjusted under 35 U.S.C. 154(b) by 0 days.

(21) Appl. No.: 10/913,148

(22) Filed: Aug. 6, 2004

(65) Prior Publication Data

US 2005/0031421 A1 Feb. 10, 2005

Related U.S. Application Data

(60) Provisional application No. 60/513,287, filed on Oct. 21, 2003.

(30) Foreign Application Priority Data

Aug. 7, 2003 (GB) .................................... 0318501

(51) Int. Cl.
*B23B 51/00* (2006.01)
(52) U.S. Cl. ............................ 407/53; 407/56; 407/58
(58) Field of Classification Search .................. 407/30, 407/53, 51, 56, 58, 60
See application file for complete search history.

(56) References Cited

U.S. PATENT DOCUMENTS

| 4,963,059 | A |   | 10/1990 | Hiyama |   |
|---|---|---|---|---|---|
| 5,115,697 | A | * | 5/1992 | Rodriguez et al. | ......... 76/108.6 |
| 5,913,644 | A |   | 6/1999 | DeRoche et al. |   |
| 6,439,811 | B1 | * | 8/2002 | Wardell | ........................ 407/54 |
| 2002/0141833 | A1 |   | 10/2002 | MacArthur |   |
| 2003/0059263 | A1 |   | 3/2003 | Chen |   |

FOREIGN PATENT DOCUMENTS

| GB |   | 1 558 932 | 1/1980 |
| GB |   | 2 181 076 A | 4/1987 |
| WO | WO | 94/21412 | 9/1994 |
| WO | WO | 95/30506 | 11/1995 |

* cited by examiner

*Primary Examiner*—Willmon Fridie, Jr.
(74) *Attorney, Agent, or Firm*—Fulwider Patton LLP

(57) ABSTRACT

Rotary cutting tools for cutting various types of sheet material are known. However, when cutting non-ferrous materials, damage known as fluttering is caused to both surfaces of the sheet material being cut. The requirement for the cutting of larger and larger sheets of material for safety critical applications such as aircraft wings has made fluttering unacceptable. Furthermore, scrapping sheets of material which exhibit fluttering is extremely expensive. Fluttering occurs as a result of excess pressure being placed on a workpiece edge as it is being cut. A rotary cutting tool (10) for a power tool is disclosed in which the cutting tool comprises body means (12) having a first flute (20, 30), a substantially planar first cutting surface (22, 32) and a first cutting edge (24, 34) formed on said first cutting surface; and wherein said first cutting edge (24, 34) is formed at a first angle to a longitudinal axis of the cutting tool. This cutting tool addresses the problems associated with fluttering.

7 Claims, 4 Drawing Sheets

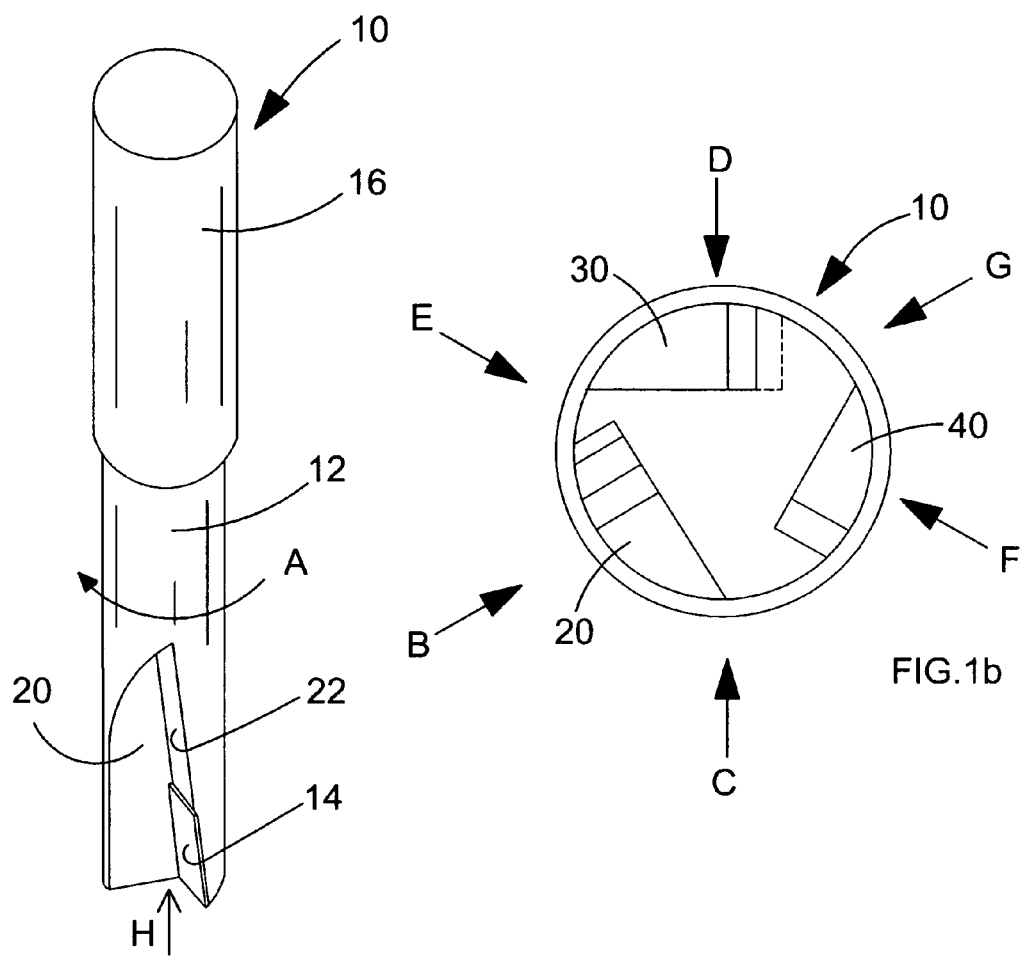
FIG.1a
FIG.1b
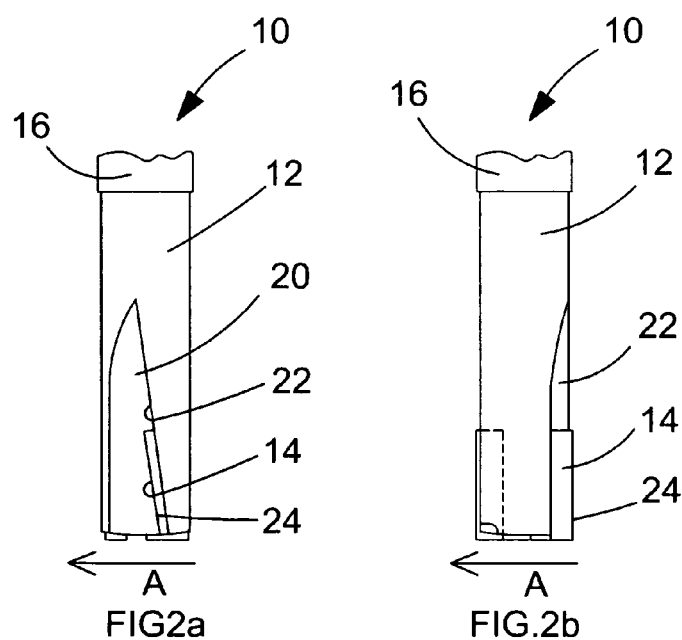
FIG.2a
FIG.2b

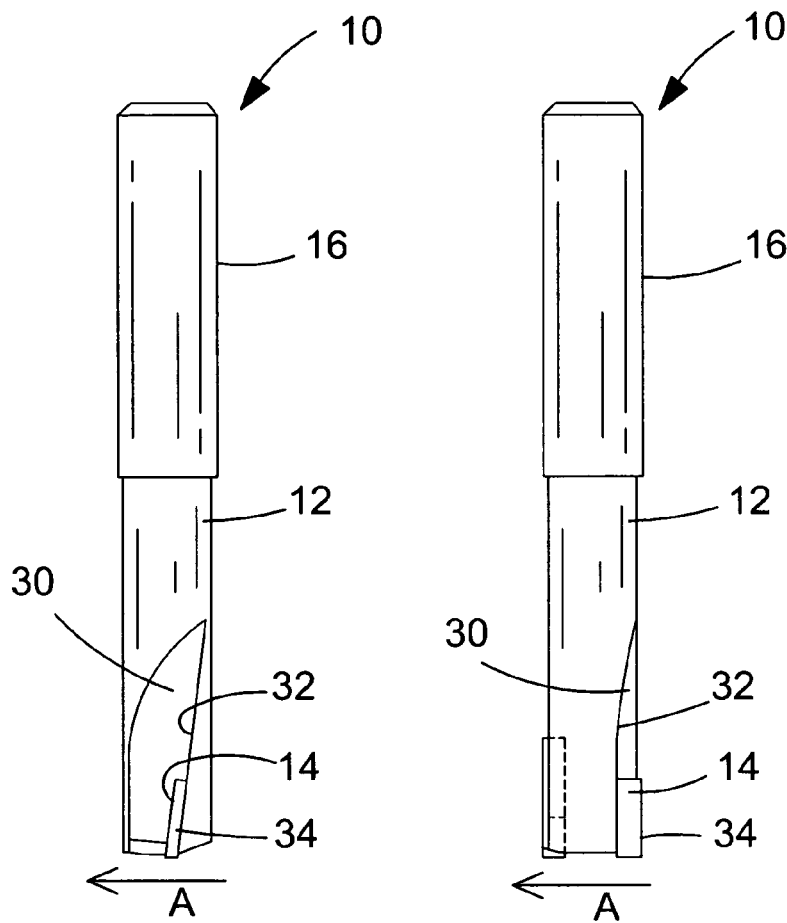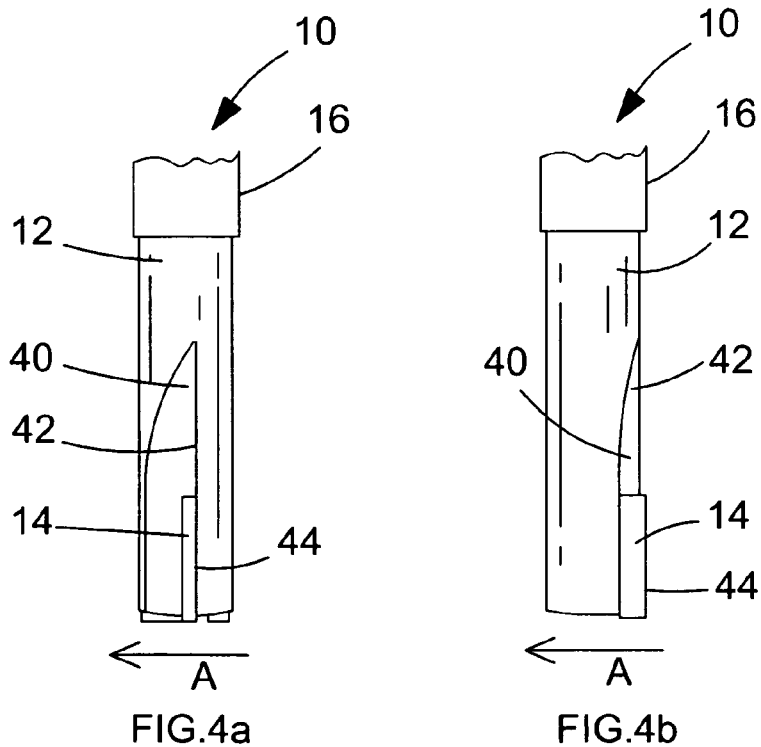

CUTTING TOOL

RELATED APPLICATIONS

This application claims priority from British patent application GB 0318501.4 filed Aug. 7, 2003, and U.S. Provisional Application No. 60/513,287 filed Oct. 21, 2003.

The present invention relates to a cutting tool and more particularly a rotary cutting tool.

Rotary cutting tools for cutting various types of sheet material are well known. In recent years there has been an increasing emphasis from several industries, such as the aviation industry for example, on certain materials such as carbon fibre and other non-ferrous materials. These materials are particularly hard to cut and hence the requirement for them has led to the development of specialist cutting tools.

Conventional specialist cutting tools for cutting non-ferrous materials typically comprise a tungsten carbide cylindrical body into which one or more flutes have been cut. Each of the flutes define a cutting surface, which is parallel to the longitudinal axis of the cutting tool. The cutting surfaces are often tipped with a segment of hard wearing material such as polycrystalline diamond (PCD).

The conventional specialist tools for cutting non-ferrous materials, however, cause damage known as fluttering to both surfaces of the sheet material being cut. The requirement for the cutting of larger and larger sheets of material for safety critical applications such as aircraft wings has made fluttering unacceptable. Furthermore, scrapping sheets of material which exhibit fluttering is extremely expensive. Fluttering occurs as a result of excess pressure being placed on a workpiece edge as it is being cut.

There is, therefore, a requirement for a cutting tool which overcomes or at least mitigates these problems.

According to the present invention there is provided a rotary cutting tool for a power tool, the cutting tool comprising: body means having a first flute, a substantially planar first cutting surface and a first cutting edge formed on said first cutting surface; and wherein said first cutting edge is formed at a first angle to a longitudinal axis of the cutting tool.

In a preferred form of the invention the body means has a second flute, a second cutting surface and a second cutting edge formed on said second cutting surface.

Advantageously, the second cutting edge is formed at a second angle to the longitudinal axis of the cutting tool.

Preferably, the second cutting edge is at an angle to the longitudinal axis of the cutting tool which is in the opposite direction to the first angle in the direction of rotation of the cutting tool.

Advantageously, the body means has at least one further flute and at least one further cutting surface having a further cutting edge. More preferably, the further cutting edge is substantially parallel to the longitudinal axis of the cutting tool.

The cutting tool may be provided with at least one transverse cutting edge, substantially perpendicular to the longitudinal axis of the cutting tool.

Preferably the transverse cutting edge extends radially from at least the longitudinal axis to at least an external perimeter of the tool.

The present invention will now be described, by way of example only, with reference to the accompanying figures in which:

FIG. 1a shows a three dimensional view of a preferred form of rotary cutting tool according to the present invention;

FIG. 1b shows an end view of the tool of FIG. 1a in the direction of arrow H;

FIG. 2a shows a side view of the cutting tool of FIG. 1a in the direction of arrow B of FIG. 1b;

FIG. 2b shows a side view of the cutting tool of FIG. 1a in the direction of arrow C of FIG. 1b;

FIG. 3a shows a side view of the cutting tool of FIG. 1a in the direction of arrow D of FIG. 1b;

FIG. 3b shows a side view of the cutting tool of FIG. 1a in the direction of arrow E of FIG. 1b;

FIG. 4a shows a side view of the cutting tool of FIG. 1a in the direction of arrow F of FIG. 1b;

FIG. 4b shows a side view of the cutting tool of FIG. 1a in the direction of arrow G of FIG. 1b;

Figure 5A:
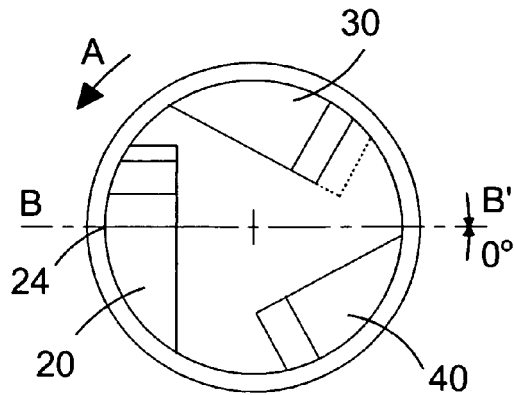
FIG. 5a shows an end view of the cutting tool in a first rotational position.

Referring to the Figures, there is shown a preferred form of cutting tool 10 for use in a power tool for cutting sheets of non-ferrous materials including carbon fibre and composites sheets such as are used in the construction of aircraft. The cutting tool comprises a cylindrical body 12, having a cutting portion at one end region and a shank 16 at the other end region for engagement in the chuck of a power tool. The body 12 is manufactured from any suitable material such as tungsten carbide or the like.

References to upper and lower parts of the cutting tool 10 herein refer to the cutting tool 10 when in the orientation shown in FIGS. 1a, 2a, 2b, 3a, 3b, 4a, 4b and 6b.

The cutting portion is provided with three flutes, a first, downshear flute 20, a second, upshear flute 30 and a third, neutral flute 40. The flutes 20, 30, 40 are preferably equi-angularly spaced about the longitudinal axis of the tool 10, although any suitable angular spacing may be used. Each flute 20, 30, 40 also has an associated cutting surface 22, 32, 42 which may be formed by the respective flute. Each cutting surface also has an associated cutting edge 24, 34, 44 which maybe formed by the respective flute 20, 30, 40 or by an insert 14. Each insert is preferably of a suitable hard wearing material such as polycrystalline diamond (PCD) or polycrystalline cubic boron nitride. In the embodiment described the inserts 14 are segments of PCD. At least one, and preferably all of the cutting edges are straight cutting edges.

As seen in FIGS. 2a and 2b the downshear flute 20 forms the cutting surface 22 at a downshear angle to the longitudinal axis of the cutting tool 10. The downshear angle is such that when the cutting tool 10 rotates about the longitudinal axis in the direction of arrow A, the upper end of the cutting edge 24 is rotationally ahead of the lower end, as viewed in FIG. 2a.

Referring now to FIGS. 3a and 3b, the upshear flute 30 forms the cutting surface 32 at an upshear angle to the longitudinal axis of the cutting tool 10. The upshear angle is in the opposite direction to the downshear angle, such that when the cutting tool 10 rotates about the longitudinal axis in the direction of arrow A, the upper end of the cutting edge 34 is rotationally behind the lower end, as viewed in FIG. 3a.

As seen in FIGS. 4a and 4b the neutral flute 40 forms a vertical cutting surface 42 and vertical cutting edge 44 parallel to the longitudinal axis as viewed in FIG. 4a.

It will be appreciated that although three flutes 20, 30, 40 are described one, two or any other suitable number of flutes may be provided with associated cutting edges 24, 34, 44 with the same or differing angles of inclination.

Typical operation of the cutting tool will now be described by way of example only with reference, in particular to FIGS. 5a to 5e.

In operation, to cut a workpiece the cutting tool 10 is rotated in the direction of arrow A about the longitudinal axis, at high rotational velocities. Whilst rotating, the cutting tool 10 is firstly orientated with its longitudinal axis substantially perpendicular to the plane of workpiece at the point of contact with the workpiece edge, and is then moved into contact with the workpiece edge. As the tool rotates each cutting edge in turn strikes the edge of the workpiece and begins the cutting process.

The cutting edges strike the edge of the workpiece in an order determined by their positioning around the cylindrical body 12. In the embodiment described, the flutes 20, 30, 40 are positioned such that if the downshear cutting edge 24 strikes first, this is followed by the upshear cutting edge 34 and then the neutral cutting edge 44. It will be appreciated, however, that the flutes can be positioned in any suitable arrangement and that any cutting surface may strike the workpiece first.

The action of the cutting edges will now be described.

In FIGS. 5a to 5e the line BB' represents a centre line of the cutting tool perpendicular to the surface of the workpiece being cut.

Figure 5B:
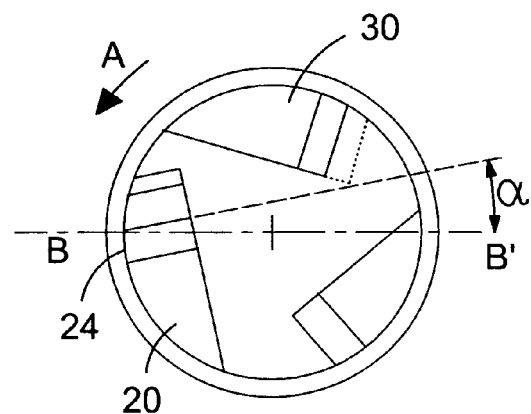
FIG. 5b shows an end view of the cutting tool in a second rotational position.

As the tool rotates, the downshear cutting edge 24 contacts the workpiece to begin a downshear cut. Referring firstly to FIG. 5a, when the upper end of the downshear cutting edge 24 rotates onto the centre line BB', it strikes the workpiece substantially normal to the surface being cut, also termed zero degrees top rake. As seen in FIG. 5b, when the lower end of the downshear cutting edge 24 rotates onto the centre line BB' it contacts the surface being cut at an acute angle α relative to the centre line BB', representing α top rake. Hence, a higher cutting force is applied at the upper end of the downshear cutting edge 24 than at the lower end. Thus, the resultant cutting force is in a direction generally perpendicular to and away from the cutting surface 22. The angle α may be any suitable value, typically, for example, 15 degrees.

Figure 5C:
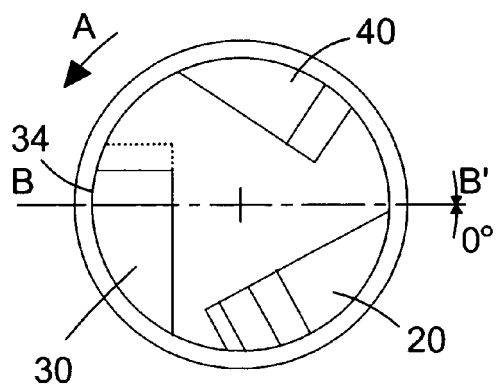
FIG. 5c shows an end view of the cutting tool in a third rotational position.
Figure 5D:
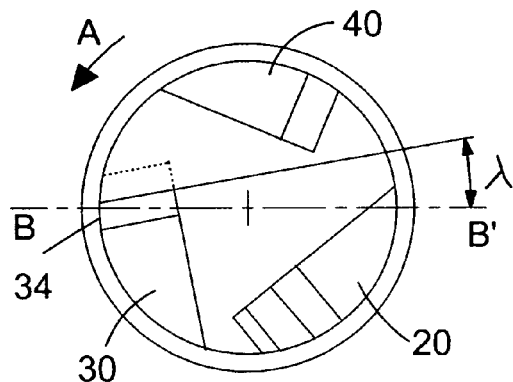
FIG. 5d shows an end view of the cutting tool in a fourth rotational position.

As the tool rotates further, the upshear cutting edge 34 contacts the workpiece to begin an upshear cut. Referring now to FIG. 5c, initially the lower end of the upshear cutting edge 34 strikes the workpiece with zero degrees top rake. As seen in FIG. 5d, when the upper end of the upshear cutting edge 24 rotates onto the centre line BB' it contacts the surface being cut at an acute angle λ relative to the centre line BB', representing λ top rake. Hence, a higher cutting force is applied at the lower end of the upshear cutting edge 34 than at the upper end. Thus, the resultant cutting force is in a direction generally perpendicular to and away from the cutting surface 32. The angle λ may be any suitable value, typically, for example, the angles α and λ are substantially equal.

Figure 5E:
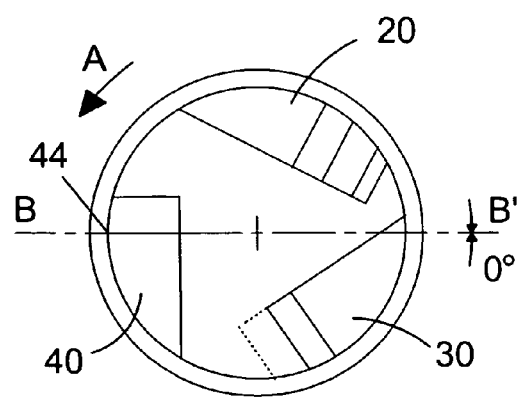
FIG. 5e shows an end view of the cutting tool in a fifth rotational position.

As seen in FIG. 5e, as the tool rotates further the vertical neutral cutting edge 44 strikes the workpiece with zero degrees top rake.

The cycle of cutting then begins again with a new downshear cut and is repeated until the cutting process is completed.

The resultant cutting forces of the upshear and downshear flutes 20, 30 reduce the excess force on the workpiece edge thus reducing fibre delamination and hence fluttering.

Figure 6A:
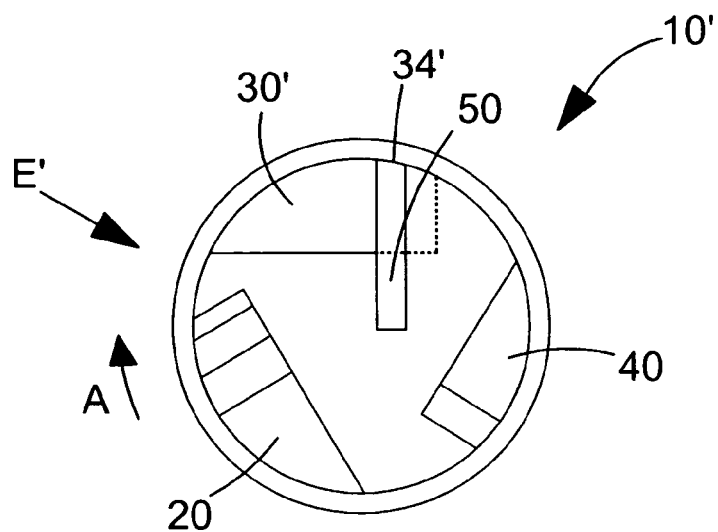
FIG. 6a shows an alternative embodiment of a cutting tool according to the invention.
Figure 6B:
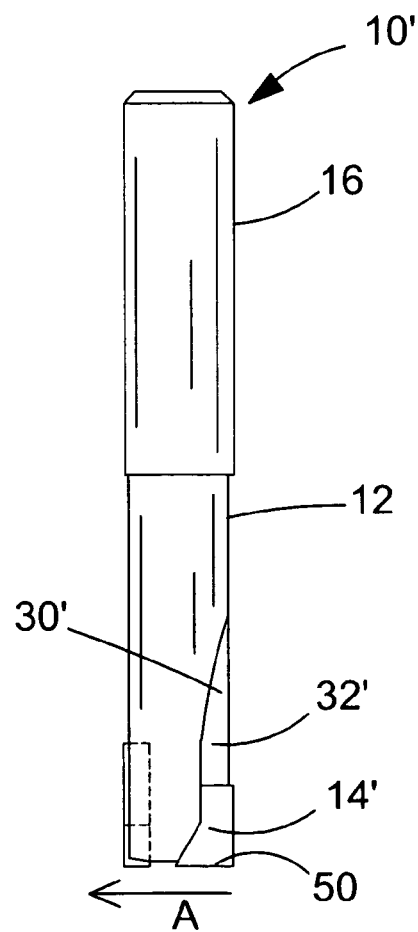
FIG. 6b shows a side view of the cutting tool of FIG. 6a in the direction of arrow E'.

FIGS. 6a and 6b show a further embodiment of the cutting tool generally at 10'. The cutting tool is generally similar to the cutting tool described earlier and like parts are given like reference numerals.

The cutting tool comprises three flutes 20, 30', 40 each having an insert generally as described for the first embodiment. The cutting tool 10' and the flutes 20, 30', 40 will not be described again in detail other than to highlight differences between the embodiments.

The insert 14' of one of the three flutes 30', in this case the upshear flute 30', comprises a segment having at least one further cutting edge 50, the further edge 50 being at least as wide as the radius of the lower end of the body 12' of the cutting tool 10'. In operation with the insert 14' in position on the cutting surface 32' of the flute 30', the edge 50 is located slightly below the lower end of the cutting surface 32', as seen in FIG. 6b, substantially perpendicular to the longitudinal axis of the body 12'. As best seen in FIG. 6a, the end 50 extends generally radially from at least the central longitudinal axis of the body 12' to at least the edge of the flute 30'.

Correspondingly, the upshear flute 30' is configured to receive the insert 14' on the associated cutting surface 32'.

It will be appreciated that although FIGS. 6a and 6b show the insert 14' being located on the upshear flute 30', any of the flutes may be configured to receive an insert similar to the insert 14'.

Typical operation of the tool 10' will now be described by way of example only.

In operation to cut to cut a workpiece the cutting tool 10' is rotated in the direction of arrow A about the longitudinal axis, at high rotational velocities. Whilst rotating, the cutting tool 10' is firstly orientated with its longitudinal axis substantially perpendicular to the plane of workpiece at the point of contact with the workpiece. The cutting tool 10' may then be moved along its longitudinal axis into contact with the workpiece so as to begin cutting a hole in the workpiece. Movement of the tool 10' may then be continued, generally along the longitudinal axis, to complete cutting the hole and to move the tool 10' into a cutting position.

Once the tool 10' is in the cutting position the tool may be used to cut the workpiece, from the hole, as generally described for the first embodiment.

What is claimed is:

1. A rotary cutting tool for a power tool, the cutting tool comprising:
    body means having:
        a rotational axis and a direction of rotation about said rotational axis;
        a first flute extending in the direction of said rotational axis and defining a substantially planar first cutting surface
        a first cutting edge formed on said first cutting surface;
        a second flute extending in the direction of said rotational axis and defining a second cutting surface;
        a second cutting edge formed on said second cutting surface; wherein:

said first cutting edge is formed at a first acute angle in the direction of rotation of said cutting tool;

said second cutting edge is formed at a second acute angle with respect to the direction of rotation of said cutting tool; and said second acute angle is in the opposite direction to said first acute angle in the direction of rotation of the cutting tool.

2. A rotary cutting tool as claimed in claim 1 in which the body means has at least one further flute defining a further cutting surface having a further cutting edge.

3. A rotary cutting tool as claimed in claim 2 in which the further cutting edge lies substantially parallel to the rotational axis of the cutting tool.

4. A rotary cutting tool as claimed in claim 1 in which the or each cutting surface is tipped with polycrystalline diamond forming the associated cutting edge.

5. A rotary tool as claimed in claim 1 in which the cutting tool is provided with at least one transverse cutting edge, substantially perpendicular to the rotational axis of the cutting tool.

6. A rotary cutting tool as claimed in claim 5 in which the transverse cutting edge extends radially from at least the rotational axis to at least an external perimeter of the tool.

7. A rotary tool as claimed in claim 1 in which said first acute angle and said second acute angle are substantially equal.

* * * * *